United States Patent

Sorrells et al.

Patent Number: 5,724,308
Date of Patent: Mar. 3, 1998

[54] PROGRAMMABLE ACOUSTIC BOREHOLE LOGGING

[75] Inventors: Martin H. Sorrells; Thomas S. Smith; Donald L. Canterbury, all of Conroe, Tex.

[73] Assignee: Western Atlas International, Inc., Houston, Tex.

[21] Appl. No.: 540,536

[22] Filed: Oct. 10, 1995

[51] Int. Cl.$^6$ ............................................. G01V 1/40
[52] U.S. Cl. .......................... 367/34; 181/103; 367/25; 340/855.7
[58] Field of Search .................. 367/25, 28, 33, 367/81, 32, 30, 34; 340/853.1, 853.3, 853.9, 854.9, 855.4, 855.5, 855.7; 364/422; 181/102, 103, 106, 107

[56] References Cited

U.S. PATENT DOCUMENTS

| | | | |
|---|---|---|---|
| 4,450,540 | 5/1984 | Mallett | 367/41 |
| 4,649,525 | 3/1987 | Angona et al. | 367/31 |
| 4,718,011 | 1/1988 | Patterson, Jr. | 367/25 |
| 4,718,046 | 1/1988 | Medlin | 367/31 |
| 4,782,910 | 11/1988 | Sims | 181/106 |
| 4,855,732 | 8/1989 | Cretin et al. | 340/854.9 |
| 4,897,646 | 1/1990 | Goodwill et al. | 340/853.9 |
| 4,904,956 | 2/1990 | Dennis et al. | 331/25 |
| 4,962,489 | 10/1990 | Medlin et al. | 367/32 |
| 4,984,221 | 1/1991 | Dennis | 367/95 |

OTHER PUBLICATIONS

Zemanek, J.; Williams, D. M. and Schmitt, M. P.; "Shear-Wave Logging Using Multipole Sources," *The Log Analyst*, pp. 233–241, May–Jun. 1991.

*Primary Examiner*—Ian J. Lobo
*Attorney, Agent, or Firm*—Katz & Cotton, L.L.P.; Richard A. Fagin

[57] ABSTRACT

A downhole acoustic logging tool having a random access memory for storing acoustic waveforms in digital format. The waveforms being transmitted from a surface logging system to the random access memory in the downhole logging tool. The logging tool playing back the stored waveforms by converting the stored digital format into an analog signal that is amplified sufficiently for driving an acoustic transmitter. A received pilot signal is used to determine the signal attenuation of the logging cable and a correction is made therefrom to the actual received acoustic signal. Complex waveform types may be programmed into the random access memory for specific formation characteristics. Tapered turn-on and turn-off of the signal waveform amplitudes reduce higher frequency spectral noise that may interfere when correlating the received acoustic signal with the transmitted acoustic signal.

7 Claims, 6 Drawing Sheets

PROGRAMMABLE ACOUSTIC BOREHOLE LOGGING

BACKGROUND OF THE INVENTION

1. Field of the Invention

The present invention relates generally to borehole acoustic logging utilizing a acoustic sonde having at least one source for generating acoustic waves and at least one acoustic receiver for detecting the acoustic waves as modified by the surrounding geological formation, and, more particularly, to an apparatus, method and system for generating an acoustic signal that may be programmably changeable in its frequency, amplitude and time duration characteristics.

2. Description of the Related Technology

Acoustic well logging has become an important method for determining the physical characteristics of subterranean geologic formations surrounding a well borehole. Measurement of the unique acoustic wave characteristics in specific geologic formations surrounding the well borehole may define physical characteristics of the formation which indicate the formation's capability of producing oil or gas. Therefore, the measurement of acoustic velocity has become a practical standard for all new wells being drilled.

Acoustic logging tools have traditionally been used to measure the velocity of acoustic waves traveling through the formation surrounding the borehole. The typical acoustic logging tool includes an acoustic energy source to send acoustic waves from the borehole into the formation and one or more acoustic energy receivers to detect the acoustic waves returning from the formation back to the borehole. Logging tools use various types of transducers as transmitters such as, for example, magnetostrictive, piezoelectric, mechanical plunger, or the like for the acoustic energy source. The velocity of the acoustic waves is determined by measuring the time required for the acoustic waves to propagate through the formation from the acoustic source to the acoustic receiver, or the time difference between two or more acoustic receivers. Logging tools use various types of acoustic receiver(s) such as, for a example, magnetostrictive, piezoelectric, or the like. The acoustic receiver(s) is used to detect the acoustic waves returning from the geological formation in the general vicinity of where the logging tool is located in the well borehole. U.S. Pat. No. 4,962,489, entitled "Acoustic Borehole Logging" by Medlin et al., discloses acoustic borehole logging systems in general and is incorporated by reference herein.

Geological formations vary depending upon the depth of the formations. Acoustic logging determines these varying formations at identifiable depths within the borehole. The various types of formations reflect, transmit, absorb, etc., acoustic waves differently at different frequencies and modes of acoustic propagation. Modes of acoustic propagation may be compressional, shear, Stonely, tube and the like. Acoustic logging utilizes these differences to determine the various characteristics of geological formations. The frequency of an acoustic energy source may be swept over a range of frequencies so that the signal amplitude variations created by the formation characteristics over the range of frequencies swept may be detected by the acoustic receiver (s). U.S. Pat. No. 4,450,540, entitled "Swept Energy Source Acoustic Logging System" by A. J. Mallett, discloses swept acoustic logging systems in general and is incorporated by reference herein.

Acoustic logging techniques depend upon the acoustic waves that return from the formation having sufficient amplitude, or power, to be detected at the logging tool receiver(s). Such techniques are prone to errors generated by random noise which occur as the logging tool is moved through the borehole. Acoustic noise may also be generated by the logging cable, the logging tool body, or logging tool body centralizers scraping along the walls of the borehole as the logging tool is moved in the well borehole. Such techniques also suffer if the formation has physical characteristics which tend to strongly attenuate the acoustic waves at certain frequencies in the sweep prior to the waves returning to the receiver(s). There may also be resonant or high "Q" areas of the formation that accentuate the acoustic signal amplitude at certain frequencies. This is commonly referred to as "ringing." Ringing can introduce errors into the well log because it may cause signal overloading of the acoustic receiver(s). Thus, the signal amplitudes at certain frequencies within the sweep may be desirable or detrimental to the quality of the overall acoustic log results.

A problem exists in that the acoustic transmitter can produce a constant amplitude output over a range of frequencies during a sweep, but the formation may so distort the amplitude of the corresponding return acoustic wave as to make computation, from the data received, of accurate logs difficult. Another cause of difficulty in evaluating data from the received acoustic wave is the inherent spectral noise generated when the acoustic transmitter is rapidly turned on and off or "pulsed" with the acoustic energy. Sharp transitions in the signal power to the acoustic transmitter may generate higher frequency spectral components that may also cause acoustic ringing in the formation, and/or spurious responses which are both undesirable and tend to introduce correlation errors during computation of the acoustic logs.

Borehole logging may be over thousands of feet of well depth. Analog signal attenuation through the logging cable extending into the well borehole and attached to the logging tool may be significant at these cable lengths. Because of the logging cable wire resistance, capacitance and inductance, there is a frequency dependent attenuation of signals from the tool receiver or to the downhole transmitter. When measurements are made during acoustic logging of the borehole, it is important that the logging cable attenuation characteristics be accounted for during data evaluation. By utilizing the inherent logging tool system attenuation characteristics, a more accurate correlation of the return acoustic wave from the downhole tool receiver(s) with the acoustic wave from the tool transmitter can be calculated.

What is needed is a downhole acoustic well logging method and apparatus that may be dynamically configurable for any type of geophysical formation encountered during the acoustic logging operation, have an improved acoustic signal source that produces substantially the desired acoustic signals without substantially generating undesired signals that produce noise and errors in the calculation of the borehole log.

SUMMARY OF THE INVENTION

Objects of the Invention

It is therefore an object of the present invention to create a downhole logging tool acoustic source comprising a means for electronically storing a waveform, a power amplifier and an acoustic transducer, said acoustic source having the capability of being dynamically programmed for its waveform characteristics such as frequency, amplitude and time duration.

Another object of the present invention is to create an acoustic logging system having improved transmit and receive correlation accuracy by measuring the signal amplitude attenuation characteristics of the downhole logging tool signal wireline cable as a function of frequency.

Yet another object is to increase acoustic energy at desired frequencies and decrease acoustic energy at undesired frequencies.

Still another object is to taper the turn-on and turn-off of the acoustic energy source so as to reduce undesirable spectral noise caused by end effects caused by rapidly turning the energy source on and off.

Another object of the present invention is to control the amplitude of an acoustic energy source.

Yet another object is to sweep the frequency at a non-linearly rate of an acoustic energy source.

Another object is to generate acoustic energy having a plurality of simultaneous frequencies.

Disclosure of the Invention

According to the present invention, at least one acoustic transmitter and at least one acoustic receiver is integrated into a downhole acoustic logging tool of a borehole logging system. The downhole tool also has a power amplifier for driving the at least one acoustic transmitter, a read-write digital memory for receiving and storing a desired digital signal waveform from the logging system at the surface of the well, and a controller for playing back the desired digital signal waveform stored in digital memory, and a digital to analog converter for converting the stored digital signal waveform into a desired analog signal. The power amplifier amplifies this desired analog signal and drives the acoustic transmitter so as to produce a desired acoustic wave for use by the logging tool. Commonly owned patent application Ser. No. 08/540,535, entitled "Multi-Bender Transducer Asymmetric Acoustic Energy Source For Downhole Logging" now abandoned by Douglas J. Patterson, Thomas S. Smith and Donald L. Canterbury, illustrates a new, novel and non-obvious method and apparatus for generating directional acoustic shear waves that may also benefit from the present invention and is incorporated by reference herein.

The at least one acoustic receiver receives acoustic waves reflected, refracted, and/or attenuated by the geologic formation surrounding the logging tool. The received analog acoustic waves are sent back up to the acoustic logging system for correlation with the corresponding acoustic signal just transmitted. A pilot signal from the at least one transmitter is also sent to the surface logging system for a more accurate determination of the downhole tool analog signal attenuation as a function of frequency over the logging wireline cable. The signal amplitude attenuation as a function of frequency of the pilot signal from the acoustic transmitter will be substantially similar to the frequency attenuation of the received signal from the at least one acoustic receiver. In this way, a more accurate and realistic attenuation factor may be determined and utilized for a more precise correction of the received acoustic signal from the formation before or after correlation between it and the pilot signal.

In a preferred embodiment of the present invention, the logging system comprises a high speed digital computer having data recorders, operator displays and an operator input device such as a keyboard. The logging computer is connected to a digital interface that transmits the desired digital signal waveform from the computer to the logging tool digital memory. The computer may be programmed to create a plurality of digital signal waveforms depending on the formation characteristics and the information required. A program may be utilized that dynamically generates digital signal waveforms depending on the previous information processed or in anticipation of expected formations. Digital signal processing logic and programs may be included to process and correlate signal information received from the downhole tool. The logging system also includes analog to digital converters for converting an analog pilot signal representing the acoustic transmitter output frequencies and amplitudes, and an analog signal from the acoustic receiver representing the acoustic signal energy being returned from the geologic formation. The pilot signal may be obtained from an analog point before or after the logging tool acoustic source power amplifier, or it may be derived from a pilot acoustic receiver located proximate to the acoustic transmitter.

An aspect of the present invention is in utilizing the amplitude of the analog pilot signal to determine the amount of amplitude compensation of the acoustic receiver signal that is needed to cancel out the amplitude attenuation as a function of frequency that was introduced because of the behavior of the logging tool cable acting as a low pass filter at the acoustic frequencies of interest. Undesired amplitude attenuation within the logging system may thus be canceled out and the remaining acoustic signal amplitude attenuation may be considered the results from the geological formation under examination. In this way, a more accurate and exact correlation may be performed with the received data and is thus an advantage over the prior art.

Another feature of the present invention is its ability to control the amplitude of the transmitted acoustic signal as a function of frequency. This is advantageous when dealing with slow formations that may greatly attenuate certain frequencies of the acoustic signal, or in fast formations having resonances at some of the frequencies of the frequency swept acoustic signal. An aspect of the present invention may be used to increase the amplitude of those frequencies being attenuated by the slow formation. The present invention may also be used to decrease the amplitude of those frequencies that may cause ringing at resonances in a fast formation.

A novel feature of the present invention is the ability to store multiple acoustic signal waveforms that may be replayed in any desired order. Non-signal periods may also be incorporated into the stored signal waveforms as desired. A plurality of simultaneous signal frequencies may be stored as the desired acoustic signal waveform. A non-linear frequency sweep may be stored as the desired signal waveform.

Another feature of the present invention is the ability to taper up the signal amplitude at the start of an acoustic signal transmission and taper down the signal amplitude at the end of the transmission. This reduces the amount of undesirable spectral noise (higher frequencies) that would have been created if sharp on and off transitions had been made in the acoustic signal transmission, and may further prevent corruption of the received signal caused by ringing from the undesired higher frequencies.

It is contemplated and within the scope of this disclosure that the method and apparatus of the present invention may be utilized to perform:

logarithmic frequency sweeps, non-linear sweeps having variable rates of amplitude change to avoid high Q "ringy" regions and enhance frequencies exhibiting high attenuation, wide band "noise" over a discrete time interval wherein the sweep frequencies are scrambled but have the required frequencies of interest so that a spread spectrum type of detection may be utilized to enhance low power signal measurements, tailored pseudo pulse having defined frequency content that has been converted into a time domain Klauder wavelet, complex conjugate burst that is changed by the formation into a pulse at the acoustic receiver which does not require deconvolution, and custom and experimental waveforms that may be defined at and during the acoustic logging so that a plurality of data may be obtained by sweep, pulse, and/or spread spectrum burst that most closely matches an anticipated seismic section.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF PREFERRED EMBODIMENTS OF THE PRESENT INVENTION

A better understanding of the present invention will be obtained when the following detailed description is read with reference to the drawings. In the drawings like elements have the same number, while similar elements have the same number with a suffix having a different lower case letter.

Figure 1:
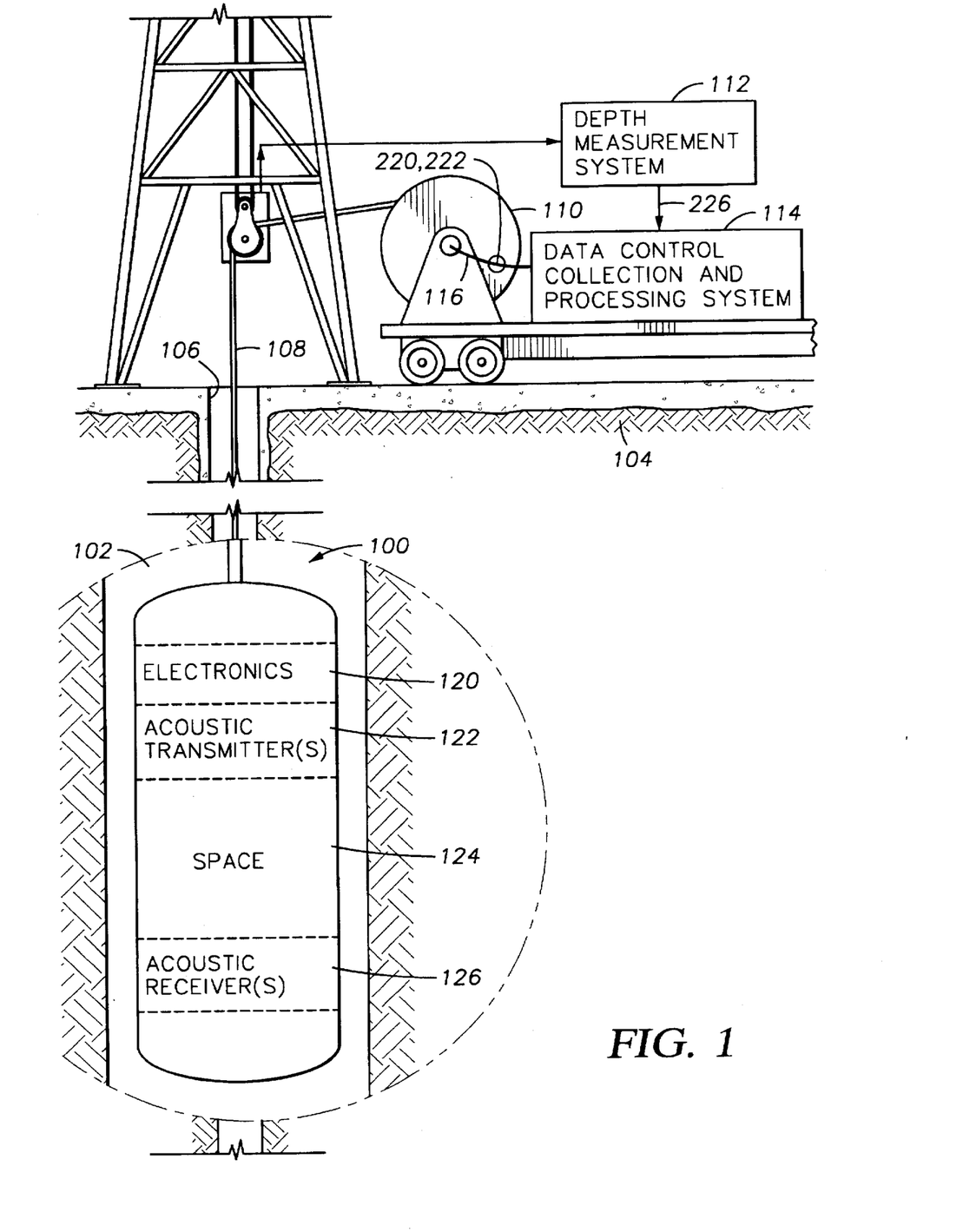
FIG. 1 is a schematic block diagram of an acoustic well logging system.

Referring now to FIG. 1, a schematic block diagram of an acoustic well logging system S, according to the present invention is illustrated. The system S comprises a downhole well logging sonde 100, a logging wireline cable 108, a winch 110, a depth measurement system 112 and a control, data collection and processing system 114. The winch 110, the depth measurement system 112 and the control, data collection and processing system 114 are located at the surface and are normally located in an equipment trailer (not illustrated) or logging truck (not illustrated).

The sonde 100 comprises electronics 120, one or more acoustic transmitter(s) 122, and one or more acoustic receiver(s). One acoustic transmitter 122 and one acoustic receiver 126 are shown for illustrative purposes only. It is contemplated and within the scope of the present invention that one or more transmitter(s) 126 and one or more receiver (s) 126 may be utilized with the system, method and apparatus of the present invention as disclosed in the specification and claims. The acoustic transmitter 122 is spatially separated from the acoustic receiver 126 by a distance or space 124.

The sonde 100 is placed into a well borehole 106 filled with a fluid 102. The sonde 100 is suspended in the borehole 106 by the logging cable 108. The cable 108 is rolled off of the winch 110 to lower and raise the sonde 100 in the borehole 106. The cable 108 also comprises an electronic cable 116 connected to the control, data collection and processing system 114 located at the surface. The electronic cable 116 comprises signal cables 220 and 222 (see FIG. 2).

As the sonde 100 is lowered, or raised, in the borehole 106, the location of the sonde 100 in the borehole 106 is determined by a depth measurement system 112. The depth measurement system 112 sends the well depth location of the sonde 100 to the control, data collection and processing system 114.

As the sonde 100 is lowered or preferably raised through the borehole 106, the sonde 100 passes different formation layers 104 that have different geologic and therefore different acoustic characteristics (not illustrated). One skilled in the art of acoustic well logging may determine these formation characteristics by their response to an acoustic wave (not illustrated) as generated by the acoustic energy source 122, modified by passage through the formation 104, received by the acoustic energy receiver 126, and collected and processed in the control, data collection and processing system 114.

Figure 2:
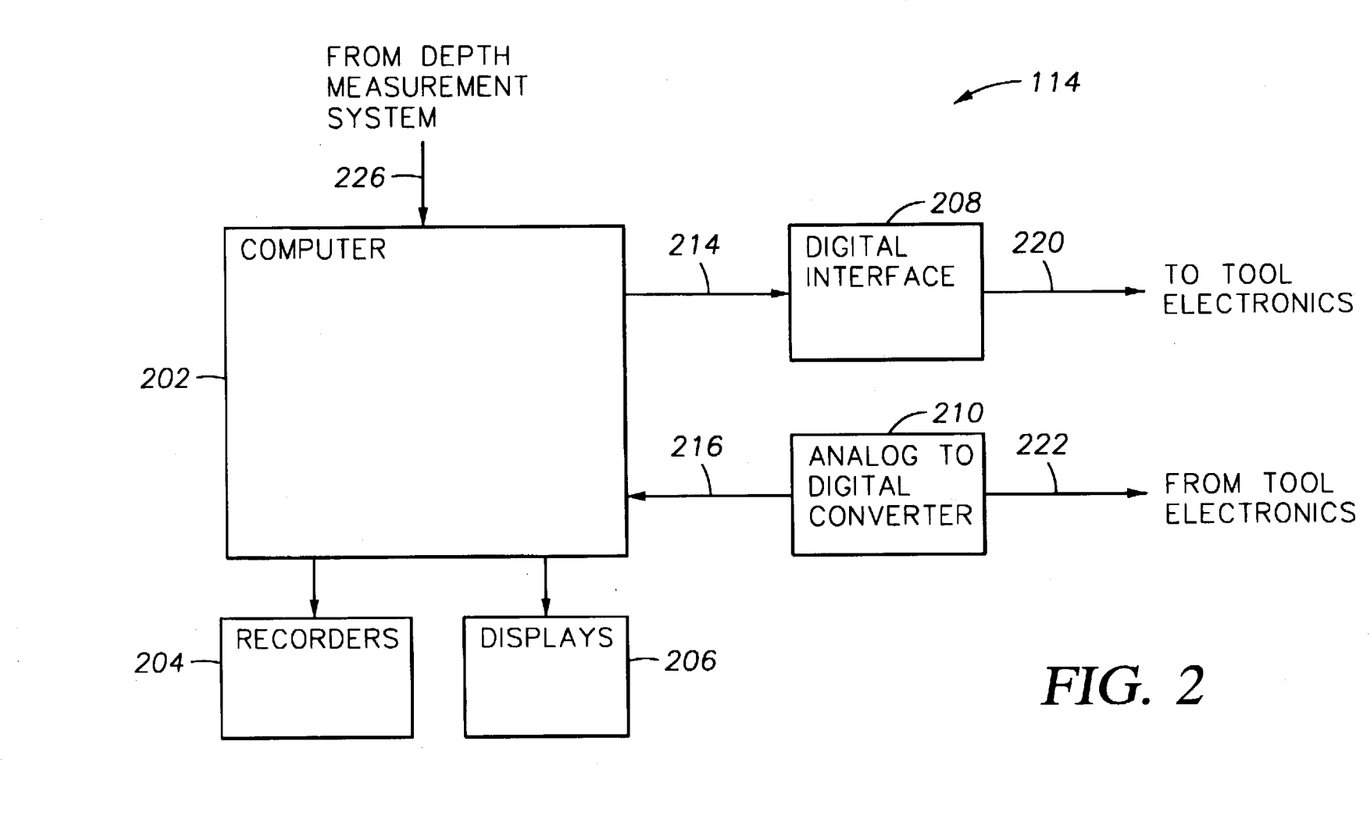
FIG. 2 is a schematic block diagram of the data control, collection and processing system illustrated in FIG. 1.

Referring to FIG. 2, a schematic block diagram of the data control, collection and processing system 114 of FIG. 1 is illustrated. The data control, collection and processing system 114 comprises a digital computer 202, data recorders 204, displays 206, a digital interface 208, and an analog to digital converter 210. The computer 202 receives the depth position of the sonde 100 in the borehole 106 from the depth measurement system 112 on signal cable 226. Acoustic log information may be displayed on the displays 206 and recorders 204.

Figure 3:
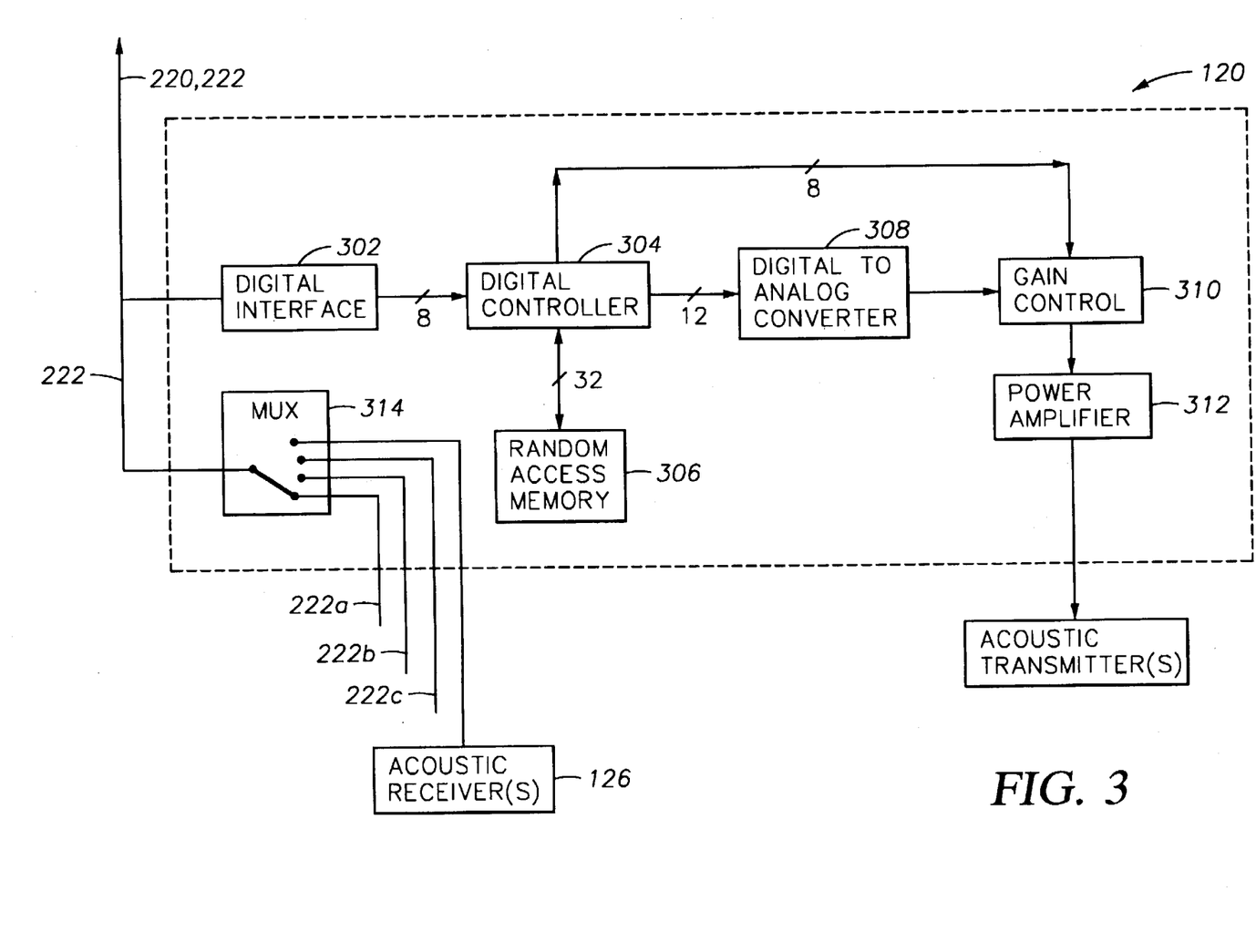
FIG. 3 is a schematic block diagram of the downhole tool electronics illustrated in FIG. 1.

Referring now to FIG. 3, a schematic block diagram of the downhole tool electronics of the present invention is illustrated. The electronics 120 (FIG. 1) comprises a digital interface 302, a digital controller 304, a random access memory (RAM) 306, a digital-to-analog converter 308, a gain control stage 310, an analog power amplifier 312, and a signal multiplexer 314. The digital interface 302 receives digital signals on cable 220 from a digital interface 208 at the system 114. Digital signals values from the system 114 are stored in the RAM 306 by the digital controller 304. These stored digital signal values are representative of the desired signal waveforms that ultimately become the acoustic waveforms generated by the acoustic transmitter 122. The signal multiplexer 314 is adapted to receive a plurality of analog signals and enable each of the plurality of signals to be carried on just one analog circuit. This is advantageous because the logging cable 108 comprising signal cables 220, 222 may be thousands of feet in length. Being able to multiplex a plurality of signals onto the signal cable 222 greatly reduces the signal cable costs associated with the tool 100.

The controller 304 may be, for example, a microprocessor, programmable logic array, or the like. The controller 304 sends the digital signal values stored in the RAM 306 to the converter 308 which then changes these digital signals into a desired analog signal waveform. The analog signal waveform from the converter 308 may be connected to the gain control stage 310. The gain control stage 310 is preferably used to independently adjust the overall gain of the analog signal from the output of the converter 308. In this way the same signal waveform may be utilized at different amplitude levels without having to reload the RAM 306 with new digital signal values from the system 114. Thus, both the signal waveform and different amplitude values of the waveform may be stored in the RAM 306.

The present invention can store one or more desired signal waveforms having the desired frequencies and amplitudes, then transmit these one or more desired signal waveforms when instructed by the system 114. It is contemplated in the present invention that any waveform or combination of signal waveforms such as, for example, swept frequency, swept frequency with the amplitude varying as a function of the frequency, multiple simultaneous frequencies, burst, complex conjugate burst and the like. A novel feature of the present invention is that any type of desired signal waveform may be stored and then acoustically transmitted into the geological formation by the transmitter 122 of the logging tool 100.

Figure 5:
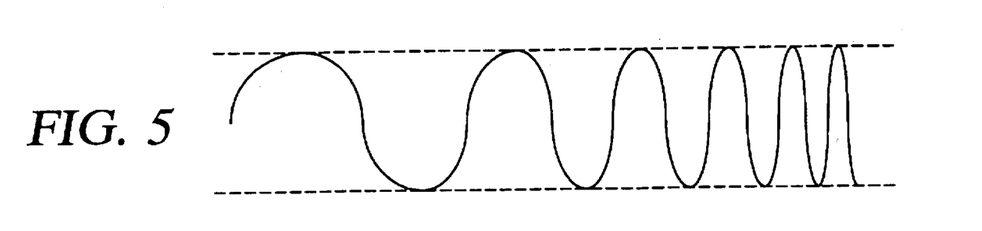
FIG. 5 is a schematic output signal waveform of the present invention.

Referring to FIG. 5, a schematic output signal waveform of the present invention is illustrated. The waveform illustrated in FIG. 5 is a swept frequency sine wave having a constant amplitude. The sine wave starts at a desired first frequency and may linearly increase to a desired second frequency. This is one of many types of signals that are possible and that may be applied to the transmitter 122 from the power amplifier 312. When the analog signal from the amplifier 312 is applied to the transmitter 122, an acoustic compressional or shear wave is produced in the formation. The acoustic wave is acoustically coupled to the borehole 106 and the formation 104 as is well known to those skilled in the art of acoustic well logging.

Referring back to FIG. 1, when the acoustic wave is transmitted from the transmitter 122 into the formation 104, the acoustic wave travels through the formation 104 and is received by the acoustic receiver 126. The receiver 126 converts the received acoustic wave into an analog electric signal that is sent to the system 114 at the surface of the well. This analog electric signal is connected to the analog to digital converter 210 (FIG. 2) over the cable 222. The converter 210 converts the analog electric signal into a digital signal representative of the originally received acoustic wave. However, because the signal on cable 222 is in an analog form, the inherent resistance, capacitance and inductance of the cable 222 will modify the amplitude of the analog signal as a function of frequency. Thus, the cable 222 becomes a low pass filter that may undesirably alter the amplitude characteristics of the received analog signal. The acoustic log information is contained in the amplitude variations of the received signal, thus any alteration of the signal amplitude by extraneous influences will degrade the ultimate accuracy of the log results.

A novel aspect of the present invention is the ability to measure the amplitude variations caused by the characteristics of the cable 222. Once these cable characteristics are known, amplitude compensation may be applied to the received signal so that the cable 222 influences may be factored out of the log presentation calculations. The present invention accomplishes this by utilizing a pilot signal derived from the transmitted signal and sent over the cable 222 to determine its characteristics.

Figure 4A:
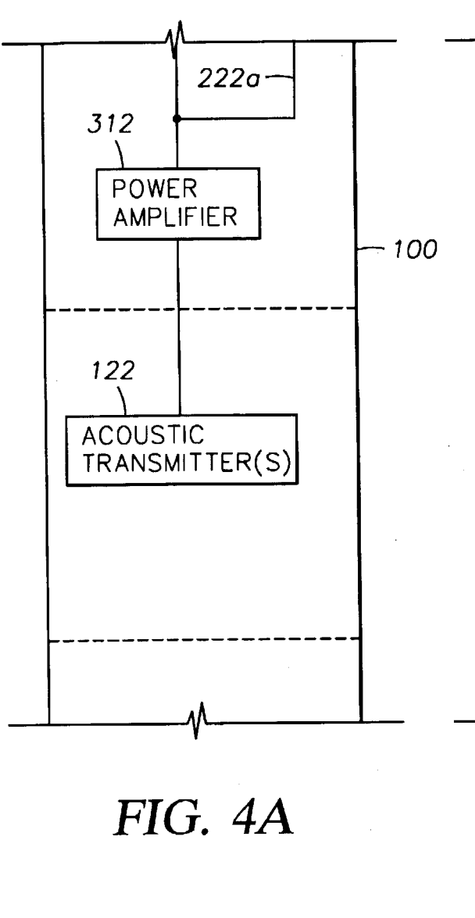
FIGS. 4A–4C are schematic block diagrams of various embodiments of an aspect of the downhole tool illustrated in FIG. 1.
Figure 4B:
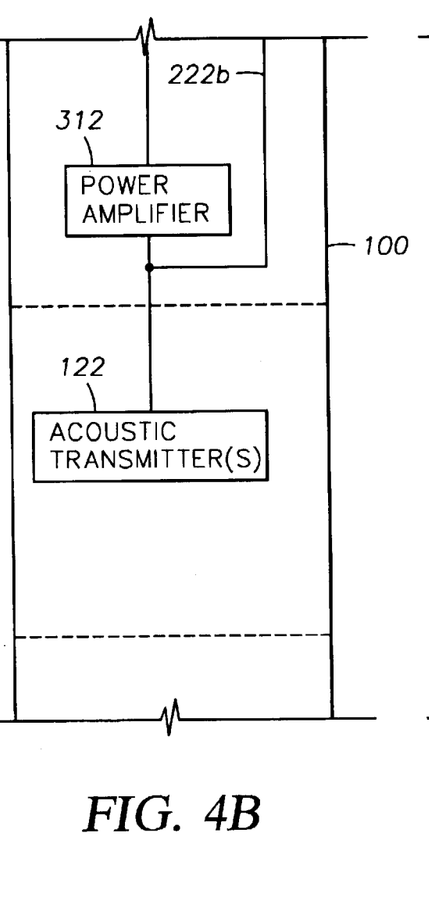
Figure 4C:
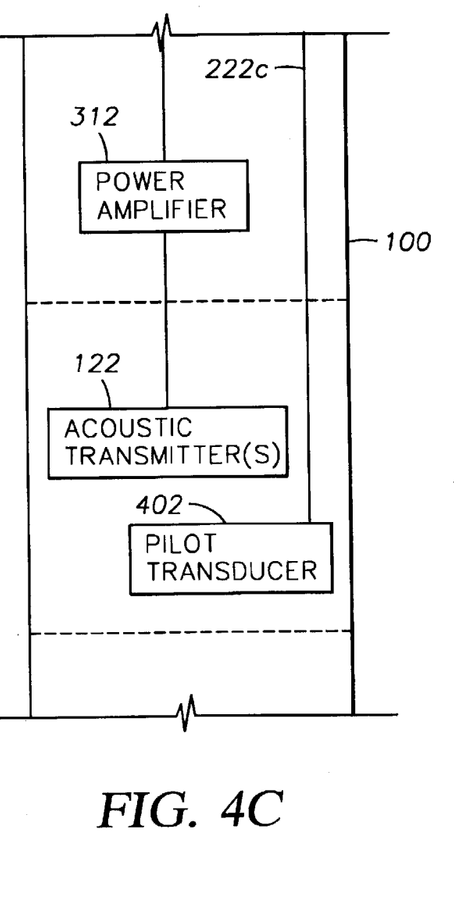

Referring now to FIGS. 4A to 4C, schematic block diagrams of various embodiments of this aspect of the present invention are illustrated. The pilot signal of FIG. 4A is obtained at the input of the power amplifier 312 and is representative of the waveform frequency and amplitude applied thereto. The pilot signal of FIG. 4B is obtained at the output of the power amplifier 312 and is representative of the waveform frequency and amplitude applied thereto. The pilot signal of FIG. 4C is obtained from a pilot transducer 402 which is acoustically coupled to the output of the transmitter 122. The pilot receiver 402 receives the acoustic signal from the transmitter 122 and produces an electrical pilot signal on cable 222c.

The purpose of the pilot signal is to produce a representative electrical signal of the output of the transmitter 122 irrespective of how the geological formation modifies the amplitude of the acoustic signal received by the receiver 126. Thus, the pilot signal on the cable 222c represents the acoustic signal of the transmitter 122 before it passes into the borehole 106 and its amplitude is modified by the formation 104.

A novel aspect of the present invention is to use the pilot signal (unmodified by the formation) in determining the amplitude modifying characteristics of the cable 222. The amplitude characteristics of the signal applied to the transmitter 122 is also known at the system 114 since it was previously downloaded to and stored in the RAM 306 of the tool electronics 120. Thus a comparison may be made between the signal sent to the electronics 120 and the pilot signal received as to the attenuation characteristics of the cable 222 as a function of frequency. Once the cable 222 attenuation characteristics are determined, these characteristics may be utilized to correct the amplitude information received from the acoustic receiver 126 by the analog-to-digital converter 210.

Figure 6:
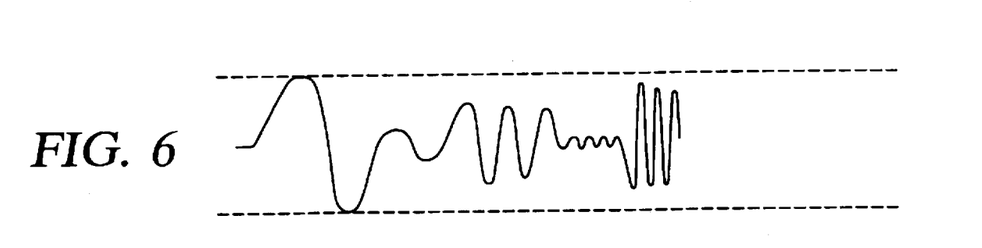
FIG. 6 is a schematic received signal waveform illustrating amplitude attenuation at certain frequencies.
Figure 7:
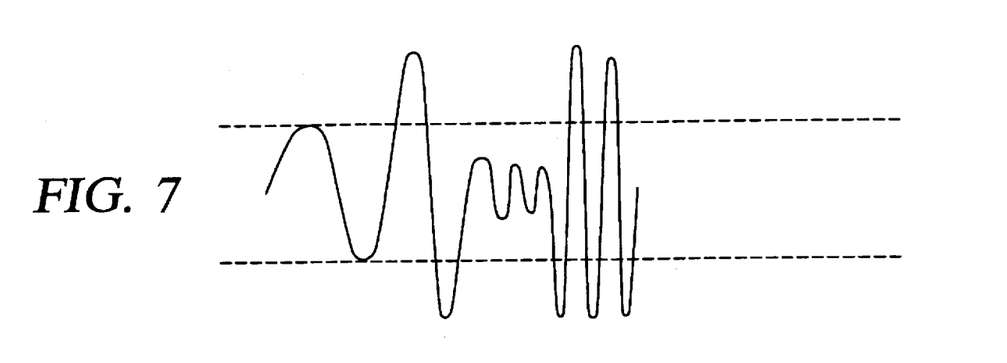
FIG. 7 is a schematic received signal waveform illustrating formation resonances at certain frequencies.

Referring now to FIGS. 6 and 7, schematic signal waveforms having amplitude modification at certain frequencies are illustrated. These signal waveforms are illustrative of acoustic signal waveforms that may be received from the formation by the receiver 126. The signal waveform of FIG. 6 illustrates the formation attenuating the waveform amplitude at certain frequencies. The signal waveform of FIG. 7 illustrates the formation causing certain frequencies to be accentuated, i.e., resonances or "ringing." Either attenuation or ringing of the acoustic signal at certain frequencies may create undesirable results, i.e., poor signal to noise ratio at the frequencies of interest, or overloading of the acoustic receiver.

A novel feature of the present invention is that the signal waveform stored in the RAM 306 of the electronics 120 (FIG. 3) can be configured to compensate for undesirable attenuation(s) and/or resonance(s) of the formation by programming in appropriate compensating amplitudes at the required frequencies. Thus, frequencies that are overly attenuated by the formation can have their amplitudes increased during transmission into the formation and, conversely, the frequencies that cause ringing may be reduced in amplitude. In this way, improved signal to noise ratio for the received acoustic waves may be obtained for formations that selectively attenuate certain frequencies, and those frequencies that cause ringing in a formation may have their amplitudes reduced.

Figure 9:
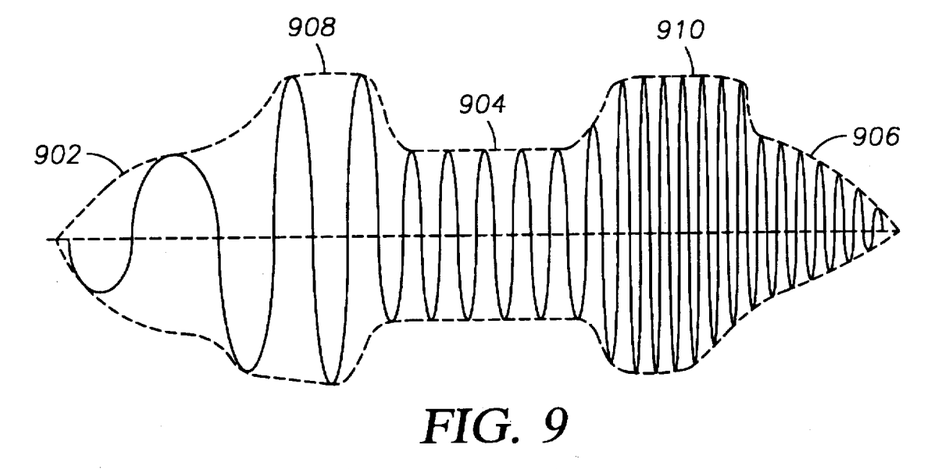
FIG. 9 is a schematic output signal waveform illustrating the tapered on and off, and amplitude enhancement features of the present invention.
Figure 10:
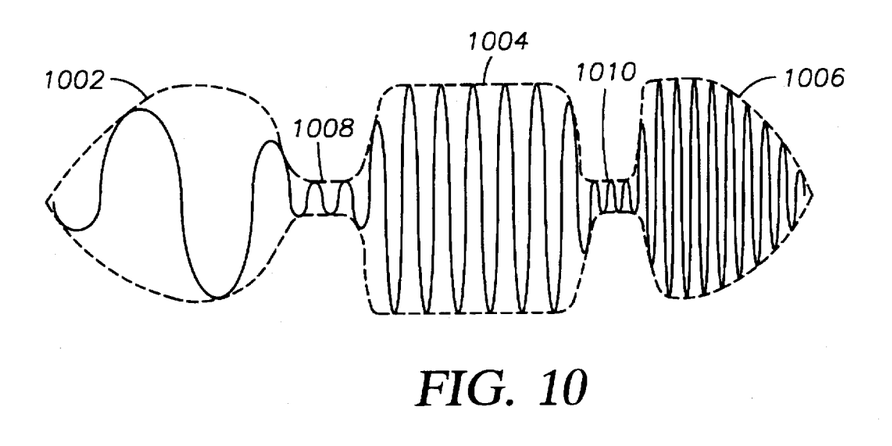
FIG. 10 is a schematic output signal waveform illustrating the tapered on and off, and amplitude suppression features of the present invention.

Referring to FIGS. 9 and 10, schematic output signal waveforms having customized amplitudes as a function of frequency are illustrated. In FIG. 9, amplitudes 908 and 910 are greater than amplitude 904. The amplitudes 908 and 910 are greater so that the acoustic wave, when attenuated through the formation, still has sufficient power at the frequencies of interest for reception of the signal with a good signal to noise ratio at the receiver 126 (FIG. 1). In FIG. 10, amplitudes 1008 and 1010 are less than amplitude 1004. Amplitudes 1008 and 1010 are at those frequencies that may cause ringing in the formation, thus, by reducing the amplitudes of the frequencies that may cause ringing, less noise is generated and better acoustic log results are obtained because undesirable overloading of the receiver 126 is reduced.

Figure 8:
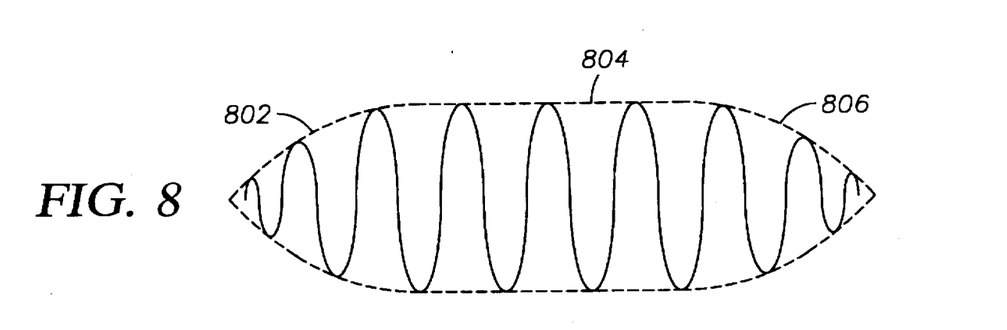
FIG. 8 is a schematic output signal waveform illustrating the tapered on and off feature of the present invention.

The transmitted acoustic waveform may generate noise in the formation by ringing, as discussed above, or it may introduce undesired high frequency components when the transmitted acoustic signal is turned on and off. Whenever a signal waveform is abruptly turned on or off, higher frequency components are generated. These higher frequency components tend to create high frequency noise in the acoustic log correlation. The present invention reduces the generation of the higher frequency components by tapering the turn-on time and turn-off time of the signal waveform. FIG. 8 is a schematic output signal waveform illustrating the tapered on and off feature of the present invention.

Amplitude 802 represents a tapered turn-on of the signal having a general amplitude of 804, and amplitude 806 is a tapered turn-off of the signal. In this way, the acoustic wave generated from the signal of FIG. 8 does not generate as much spectral noise as would a signal having sharp on and off amplitude transitions. In similar fashion the waveforms of FIGS. 9 and 10 have tapered turn-on amplitudes 902 and 1002, and tapered turn-off amplitudes 906 and 1006, respectively.

Figure 11:
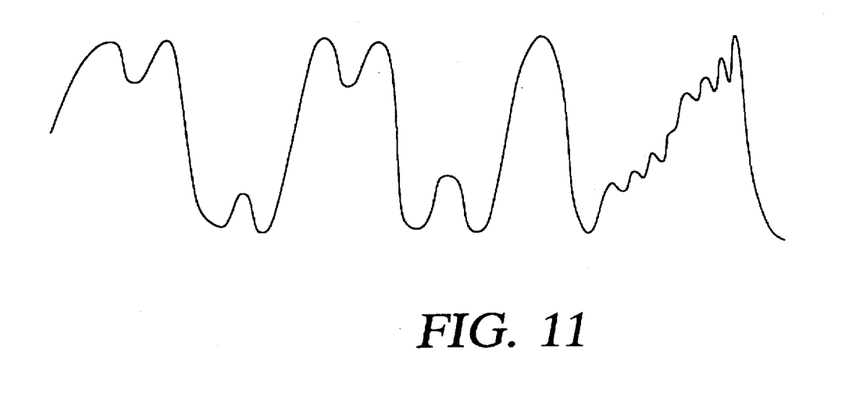
FIG. 11 is a schematic output signal waveform of the present invention illustrating a plurality of acoustic frequencies being simultaneously transmitted.

The present invention may also be programmed to produce complex waveforms having a plurality of simultaneous frequencies which will produce an acoustic wave having a plurality of simultaneous waves at these frequencies. Referring to FIG. 11, a schematic output signal waveform of the present invention having a plurality of acoustic frequencies being simultaneously transmitted is illustrated. Fundamental and harmonic frequencies are illustrated, but one skilled in the art may readily appreciate that non-harmonically related frequencies may also be simultaneously generated with the present invention.

The present invention, therefore, is well adapted to carry out the objects and attain the ends and advantages mentioned, as well as others inherent therein. While presently preferred and most preferred embodiments of the invention have been given for purposes of disclosure, numerous changes in the details of construction, interconnection and arrangement of parts will readily suggest themselves to those skilled in the art and which are encompassed within the spirit of the invention and the scope of the appended claims.

What is claimed is:

1. A method for generating a waveform for driving a transmitter in an acoustic well logging instrument inserted into a wellbore, comprising:

energizing said transmitter with a signal having an initial waveform;

receiving acoustic energy propagated along said wellbore so as to generate a receiver signal;

comparing said receiver signal to said initial waveform; and adjusting said initial waveform by reducing amplitudes of component frequencies of said initial waveform which excite ringing in certain earth formations penetrated by said wellbore.

2. The method as defined in claim 1 wherein said step of adjusting includes tapering a turn-on amplitude and a turn-off amplitude of said initial waveform.

3. A method of logging a wellbore penetrating earth formations, comprising:

inserting an acoustic well logging instrument into said wellbore, said instrument including at least one transmitter and one receiver;

periodically energizing said at least one transmitter with a signal having an initial waveform;

receiving acoustic energy propagated along said wellbore at said at least one receiver;

comparing a signal generated by said receiver in response to said propagated acoustic energy to said initial waveform; and adjusting said initial waveform by reducing amplitudes of component frequencies of said initial waveform which excite ringing in certain earth formations penetrated by said wellbore.

4. A method for generating a waveform for driving a transmitter in an acoustic well logging instrument inserted into a wellbore, comprising:

energizing said transmitter with a signal having an initial waveform;

receiving acoustic energy propagated along said wellbore so as to generate a receiver signal;

comparing said receiver signal to said initial waveform; and adjusting said initial waveform by increasing amplitudes of component frequencies of said initial waveform which are attenuated by particular earth formations penetrated by said wellbore.

5. A method of logging a wellbore penetrating earth formations, comprising:

inserting an acoustic well logging instrument into said wellbore, said instrument including at least one transmitter and one receiver;

periodically energizing said at least one transmitter with a signal having an initial waveform;

receiving acoustic energy propagated along said wellbore at said at least one receiver;

comparing a signal generated by said receiver in response to said propagated acoustic energy to said initial waveform; and adjusting said initial waveform by increasing amplitudes of component frequencies of said initial waveform which are attenuated by particular earth formations penetrated by said wellbore.

6. A method of logging a well bore penetrating earth formations, comprising:

inserting an acoustic well logging instrument into said wellbore, said instrument including at least one transmitter and one receiver;

periodically energizing said at least one transmitter with a signal having an initial waveform;

receiving acoustic energy propagated along said wellbore at said at least one receiver;

comparing a signal generated by said receiver in response to said propagated acoustic energy to said initial waveform; and adjusting said initial waveform by boosting high frequency components of said initial waveform to compensate for low pass filtering of an electrical logging cable connecting said instrument to a recording system at the earth's surface.

7. The method as defined in claim 6 wherein said step of boosting includes directly receiving an output of said at least one transmitter, comparing said directly received signal to said initial waveform, and adjusting said initial waveform so as to compensate frequency components attenuated by said logging cable.

* * * * *